(12) United States Patent
Parendo et al.

(10) Patent No.: US 11,203,073 B2
(45) Date of Patent: Dec. 21, 2021

(54) HOLE SAW WITH OPEN END CAP GEOMETRY

(71) Applicant: Milwaukee Electric Tool Corporation, Brookfield, WI (US)

(72) Inventors: Brett Parendo, Milwaukee, WI (US); Marcus Carli, Brookfield, WI (US); Bryan C. Ward, Wauwatosa, WI (US); Andrew Schulz, Slinger, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/721,014

(22) Filed: Dec. 19, 2019

(65) Prior Publication Data

US 2020/0122245 A1 Apr. 23, 2020

Related U.S. Application Data

(63) Continuation of application No. 15/366,420, filed on Dec. 1, 2016, now abandoned.

(60) Provisional application No. 62/264,605, filed on Dec. 8, 2015.

(51) Int. Cl.
*B23B 51/04* (2006.01)

(52) U.S. Cl.
CPC .... *B23B 51/0406* (2013.01); *B23B 2251/428* (2013.01)

(58) Field of Classification Search
CPC .......... B23B 51/0406; B23B 2251/428; B23B 51/0473; B28D 1/041; B27B 5/12; Y10T 408/895; Y10T 408/8953; Y10T 408/8957
See application file for complete search history.

(56) References Cited

U.S. PATENT DOCUMENTS

| | | | | |
|---|---|---|---|---|
| 1,669,273 | A | * | 5/1928 | Wojnowski ......... B23B 51/0426 408/86 |
| 2,053,702 | A | * | 9/1936 | Davis .................. B23B 51/0426 408/125 |
| 2,779,361 | A | | 3/1954 | McKiff |
| 2,782,854 | A | * | 2/1957 | Muhlbach ................ B26D 1/44 83/663 |
| 3,025,917 | A | | 3/1962 | Knoblauch |
| 3,880,546 | A | | 4/1975 | Segal |
| 3,973,862 | A | | 4/1976 | Segal |
| 4,072,441 | A | | 2/1978 | LaPointe |
| 6,007,279 | A | * | 12/1999 | Malone, Jr. ......... B23B 51/0433 144/150 |
| D478,106 | S | | 8/2003 | Morton et al. |
| D478,339 | S | | 8/2003 | Morton et al. |
| 6,857,831 | B2 | | 2/2005 | Davis |
| 6,890,132 | B1 | | 5/2005 | Baron et al. |
| D516,594 | S | | 3/2006 | Morton |

(Continued)

*Primary Examiner* — Eric A. Gates
*Assistant Examiner* — Paul M Janeski
(74) *Attorney, Agent, or Firm* — Reinhart Boerner Van Deuren s.c.

(57) ABSTRACT

A tool, such as a hole saw, including an open end cap geometry is provided. The end cap includes spokes extending between a hub and a rim. A plurality of openings are defined between the spokes, hub and rim. The area of the openings is substantially large relative to the area of the end cap such that the end cap is relatively lightweight and provides access into the hole saw for debris removal. The spokes are shaped and positioned to provide strength to the end cap.

20 Claims, 5 Drawing Sheets

(56) References Cited

U.S. PATENT DOCUMENTS

| | | |
|---|---|---|
| D588,175 S | 3/2009 | Morton |
| 8,052,356 B2 | 11/2011 | Singh |
| D659,176 S | 5/2012 | Novak et al. |
| D687,472 S | 8/2013 | Novak et al. |
| D690,334 S | 9/2013 | Zielonka et al. |
| 8,573,907 B2 | 11/2013 | Kalomeris et al. |
| 8,579,555 B2 | 11/2013 | Novak et al. |
| 8,790,052 B2 | 7/2014 | Baratta |
| 8,840,344 B2 | 9/2014 | Stenman |
| 2008/0181738 A1 | 7/2008 | Capriotti et al. |
| 2009/0035082 A1 | 2/2009 | Singh |
| 2010/0310332 A1 | 12/2010 | Serba |
| 2011/0170965 A1 | 7/2011 | Novak et al. |
| 2011/0170971 A1 | 7/2011 | Novak et al. |
| 2011/0170972 A1 | 7/2011 | Zielonka et al. |
| 2014/0112728 A1 | 4/2014 | Baratta |
| 2015/0239051 A1 | 8/2015 | Novak et al. |
| 2016/0059322 A1* | 3/2016 | Breslaw ................ B28D 1/041 408/204 |

* cited by examiner

HOLE SAW WITH OPEN END CAP GEOMETRY

CROSS-REFERENCE TO RELATED PATENT APPLICATIONS

The present application is a continuation of U.S. application Ser. No. 15/366,420, filed Dec. 1, 2016, which claims priority to U.S. Provisional Application No. 62/264,605, filed Dec. 8, 2015, which are incorporated herein by reference in their entireties.

BACKGROUND OF THE INVENTION

The present invention relates generally to the field of tools. The present invention relates specifically to a tool, such as a hole saw, having an open end cap geometry. In general, a hole saw includes a cylindrical structure with cutting teeth at one end of the cylinder. In use, the hole saw spins at a high rate of speed, cutting a hole in a work piece that has a size and shape that generally matches the size and shape of the cylindrical structure.

SUMMARY OF THE INVENTION

One embodiment of the disclosure relates to a tool, specifically a hole saw, including a body, such as a cylindrical saw body, and an end cap. The saw body includes a cutting edge at a first end of the saw body, and a second end of the saw body is coupled to an outer section of the end cap. The end cap includes a plurality of spokes extending radially from a central hub to the outer section. The end cap includes a plurality of openings defined between the spokes. In various embodiments, the openings account for a substantially large portion of a total area of the end cap. In various embodiments, the portion of the total area of the end cap occupied by the openings decreases the overall weight of the end cap. In various embodiments, the openings are substantially large providing an access point for debris removal.

In various embodiments, each of the spokes includes a concave curved clockwise-facing surface and a convex counterclockwise-facing surface. In various embodiments, the end cap includes at least four spokes.

In various embodiments, the openings are sized such that at least 10% of the total end cap area is occupied by the openings. In various embodiments, the openings are sized such that at least 30% of the total end cap area is occupied by the openings. In various embodiments, the openings are sized such that at least 60% of the total end cap area is occupied by the openings.

In various embodiments, the ratio of the area of the openings to the area of the solid portions of end cap is between 0.15 and 2. In various embodiments, the ratio of the area of the openings to the area of the solid portions of end cap is between 0.15 and 0.45. In various embodiments, the ratio of the area of the openings to the area of the solid portions of end cap is between 0.3 and 0.7. In various embodiments, the ratio of the area of the openings to the area of the solid portions of end cap is between 1 and 2.

Another embodiment of the disclosure relates to a hole saw. The hole saw includes a cylindrical body having a first edge located at a first end of the cylindrical body and a second edge located at a second end opposite the first end. The hole saw includes cutting teeth extending from the first end of the cylindrical body. The hole saw includes an end cap coupled to the second end of the cylindrical body. The end cap includes a hub and a plurality of end cap openings located radially between the hub and an outer perimeter edge of the end cap. The plurality of end cap openings occupy a relatively large portion of the area of the end cap, and the relatively large portion is at least 10% of the area bounded by the outer perimeter edge of the end cap. The hole saw includes an arbor configured to couple the hole saw to a driving tool, and the arbor is coupled to the hub and extends outward from the end cap in a direction opposite from the cutting teeth.

Another embodiment of the disclosure relates to a hole saw. The hole saw includes a cylindrical body having a first edge located at a first end of the cylindrical body and a second edge located at a second end opposite the first end. The hole saw includes cutting teeth extending from the first end of the body. The hole saw includes an end cap coupled to the second end of the body. The end cap includes a central hub and an outer perimeter edge coupled to the second edge of the cylindrical body. The end cap includes at least four spokes extending radially outward from the central hub toward the outer perimeter edge and a plurality of openings defined within the end cap. Each of the plurality of openings is located between an adjacent pair of spokes.

Another embodiment of the disclosure relates to a reduced weight hole saw. The reduced-weight hole saw includes a body having a first end and a second end opposite the first end and cutting teeth extending from the first end of the body. The reduced-weight hole saw includes an end cap which is coupled to the second end of the body and which has an outer edge surrounded by and coupled to the second end of the body. The reduced-weight hole saw includes an open area defined in the end cap, and the open area extends between upper and lower surfaces of the end cap such that access through the end cap to an interior of the body is provided by the open area. The open area has a first area and the upper surface of the end cap has a second area, and the first area is between 20% and 70% of the second area.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Referring generally to the figures, various embodiments of a hole cutter or hole saw including an open end cap design are shown. In general, a hole saw includes a cylindrical sidewall, a cutting end having cutting teeth at one end of the cylindrical sidewall and an end cap at the other end of the cylindrical sidewall. As will be generally understood, the end cap includes a mounting structure that mounts to a driving device (e.g., a power tool) that drives the hole saw in rotation to cut a hole in a workpiece. In various embodiments, the end cap of the hole saw discussed herein includes an open design or end geometry in which a substantially large portion of the area circumscribed about the perimeter of the end cap (e.g., at least 10%, at least 20%, at least 50%, at least 60%, etc.) are occupied by openings that extend between opposing upper and lower surfaces of the end caps. In at least some embodiments, the end caps discussed herein include spokes extending from a central mounting hub radially outward to a circumferential rim defining the outer perimeter of the end cap. The rim is coupled to the cylindrical sidewall.

In various embodiments, it is believed that the open end cap geometry discussed herein provides a number of improved functional advantages not found in conventional hole saws that include closed end caps or end caps with relatively small openings. In various embodiments, it is believed that the open end cap geometry discussed herein lowers the amount of material needed and weight of the end cap without decreasing hole saw cutting performance or the ability of the end cap to transfer power from the driving tool to the cutting edge of the saw. In some embodiments, it is believed that the open end cap structure discussed herein provides better access into the interior of the hole saw which facilitates debris removal, for example during cutting. In some embodiments, improved end access may operate in conjunction with side access to allow for easier debris/plug removal after cutting. Further, in some embodiments, the open end cap design provides improved air flow into the interior of the hole saw during cutting. In some embodiments, the lower weight end cap discussed herein decreases the moving mass of the tool which improves battery life/decreases power usage and which also reduces wear and tear on various moving parts of the tool, such as gears, for example when the tool stops. In some embodiments, the reduced weight provides various manufacturing advantages due to handling of a lighter weight piece and/or new formation methods made available by the open end cap design. Further decreasing the overall weight and material used in the end cap also decreases the material cost of the component.

In particular embodiments, Applicant has identified a curved spoke design in which the outer surfaces of spokes curve or arc in the direction of cutting rotation, such that at least a portion of the spokes experience compressive forces during cutting without experiencing any significant tensile forces during cutting. Applicant believes that such design allows for the inclusion of the large end cap openings discussed herein while providing sufficient strength for high-powered cutting operations. As disclosed herein, Applicant has identified a number of particular end cap design configurations that Applicant believes provide one or more of the various improved functions discussed herein while also providing a sufficient strength and support for the hole saw during cutting. In various embodiments, in contrast to conventional manufacturing methods that form conventional end caps from a solid sheet of material, the open end cap design discussed herein enables the use of a variety of methods including powder metallurgy, investment casting, metal injection molding, metal stamping, etc. which opens up new manufacturing processes and efficiencies compared to conventional manufacturing methods. Thus, in various embodiments, the open end cap design discussed herein provides a combination of potential cost savings stemming from the availability of new manufacturing methods for end cap formation.

Figure 1:
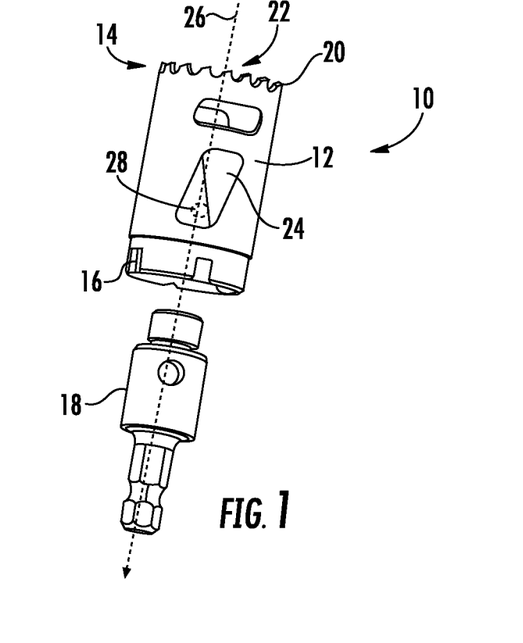
FIG. 1 is a perspective view of a hole saw, according to an exemplary embodiment.

Referring to FIG. 1, a hole saw, such as hole saw 10, is shown according to an exemplary embodiment. Hole saw 10 includes a cylindrical body 12 including cutting end 14 at a first end of body 12 and an end cap 16 coupled to the opposite, second end of body 12. In general, end cap 16 is a disc of metal material (including one or more of the various opening or spoke configurations discussed herein) that may be coupled to body 12 via a coupling structure such as a weld. In various embodiments, end cap 16 includes a central mounting portion for coupling to a tool attachment structure, shown as arbor 18. As will be generally understood, arbor 18 facilitates coupling of hole saw 10 to a driving device (e.g., an impact driver, power drill driver, etc.) which drives hole saw 10 during cutting.

As shown in FIG. 1, cutting end 14 includes a plurality of teeth 20 that extend around cutting end 14. Teeth 20 may be formed in a wide variety of designs for different cutting applications. Further, cylindrical body 12 is a substantially hollow cylinder defining a hollow internal area 22 bounded by inner surface 24 of body 12. As will be explained in more detail below, the open geometry of the end cap embodiments discussed herein provide additional access points through the end cap to facilitate removal of cutting debris from internal area 22.

Further, as shown in FIG. 1, hole saw 10 defines a longitudinal axis 26 that extends lengthwise through hole saw 10, perpendicular to end cap 16 and perpendicular to a plane defined by cutting end 14. Further, hole saw 10 includes a center of gravity 28 located along the length of longitudinal axis 26. Because of the open end geometry of end cap 16 (discussed in more detail below), center of gravity 28 is shifted further along longitudinal axis 26 toward cutting end 14, as compared to a hole saw with a heavier end cap, a closed-off end cap, or an end cap with smaller/fewer end cap openings.

Referring to FIGS. 2-9, various embodiments of an end cap for a hole saw are shown. It should be understood that, generally, any of the end cap embodiments discussed herein may be the end cap 16 of hole saw 10 as shown in FIG. 1.

Figure 2:
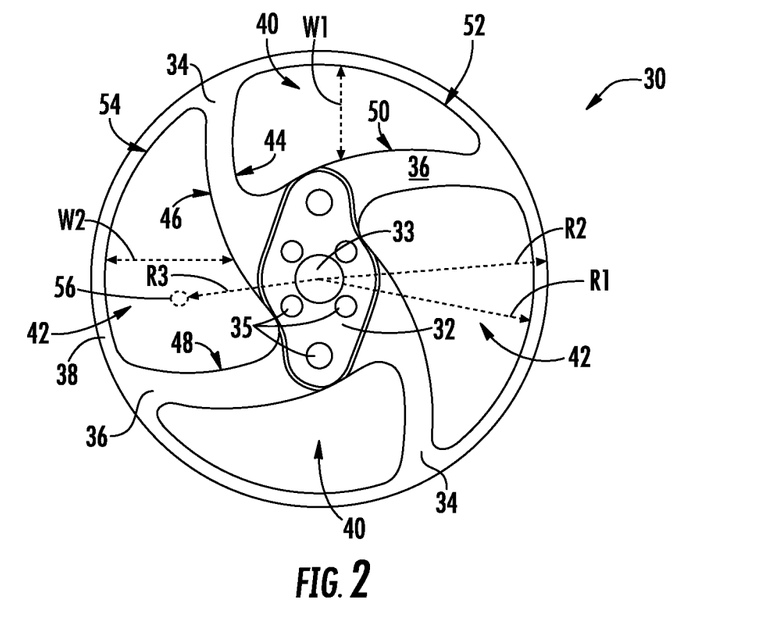
FIG. 2 is a top plan view of an end cap of a hole saw, according to an exemplary embodiment.

Referring to FIG. 2, a hole saw end cap 30 is shown according to an exemplary embodiment. In general, hole saw end cap 30 is a solid, rigid structure including a central hub 32, a first pair of spokes 34, a second pair of spokes 36 and an outer section, shown as outer rim 38. In general, hub 32 includes a central hole 33 for receiving an arbor and a plurality of drive pin holes 35 for receiving the drive pins of the arbor. Spokes 34 and 36 extend radially outward from hub 32 toward rim 38. As will be generally understood, one end of hole saw body 12 (shown in FIG. 1) is mounted to a lower surface of rim 38. It should be noted that in the embodiment shown, outer rim 38 is a contiguous circular structure defining a circular outer edge or perimeter of end cap 30. However, in other embodiments (see FIG. 9 below), the outer section of end cap 30 may be discontinuous such that gaps are located along the outer perimeter of end cap 30.

In various embodiments, hole saw end cap 30 includes a plurality of inner surfaces that define a plurality of openings bounded circumferentially by rim 38. In the particular embodiment shown, hole saw cap 30 includes a first pair of openings 40 and second pair of openings 42. In general, openings 40 and 42 are through-bores extending between opposing upper and lower surfaces of end cap 30 such that access is provided into the interior of hole saw body 12 through openings 40 and/or 42. Such large openings may advantageously allow debris to be pushed out of hole saw 10 through the large opening circumscribed by cutting end 14. It is believed that, in at least some embodiments, the longitudinal pushing direction enabled by openings 40 and 42 allow for easier debris removal compared to some side wall opening designs. Further, it is believed that the large openings 40 and 42 may provide improved airflow within hole saw 10 during cutting.

In the embodiment shown, openings 40 have a different size and shape than openings 42, and specifically openings 40 are smaller than openings 42. Hole saw end cap 30 is formed such that each opening 40 is a mirror-image of the opposing opening 40 relative to the center point of end cap 30 and that each opening 42 is a mirror image of opposing opening 42 relative to the center point of end cap 30. In the particular embodiment shown, while openings 40 and 42 form mirror images of each other, openings 40 and 42 and spokes 34 and 36 define an end cap pattern that is not radially symmetric.

As shown in FIG. 2, openings 40 and openings 42 account for a substantially large portion of the area of hole saw end cap 30. In particular embodiments, the outermost edge or perimeter of rim 38 defines or circumscribes a total end cap area, and the total end cap area is the sum of the area of all of the solid components of end cap 30 (e.g., hub 32, spokes 34 and 36 and rim 38), of openings 40 and 42 and of the areas of the mounting openings within hub 32. In one embodiment, the area of openings 40 and 42 is at least 10% of the total end cap area. In another embodiment, the area of openings 40 and 42 is at least 30% of the total end cap area. In another embodiment, the area of openings 40 and 42 is at least 60% of the total end cap area. In another embodiment, the area of openings 40 and 42 (e.g., the total open area of end cap 30 excluding openings 33 and 35) is greater than 20% and less than 70% of the total end cap area.

In particular embodiments, the area of openings 40 and 42 is between 15% and 35%, specifically between 20% and 30%, and more specifically between 20% and 25% of the total end cap area, and in one such specific embodiment, the diameter of end cap is between 2 and 3 inches and specifically is about 2.5 inches. In other particular embodiments, the area of openings 40 and 42 is between 20% and 50%, specifically between 30% and 40%, and more specifically between 33% and 37% of the total end cap area, and in one such specific embodiment, the diameter of end cap is between 3 and 5 inches and specifically is about 4 inches. In other particular embodiments, the area of openings 40 and 42 is between 40% and 80%, specifically between 50% and 70%, more specifically between 60% and 70%, and even more specifically between 61% and 65% of the total end cap area, and in one such specific embodiment, the diameter of end cap is between 5 and 7 inches and specifically is about 6 inches.

In various embodiments, the substantially large openings 40 and 42 can be defined by the ratio of the area of openings 40 and 42 to the area of the solid portions (e.g., hub 32, spokes 34 and 36 and rim 38) of end cap 30. In various embodiments, the ratio of the area of openings 40 and 42 to area of the solid portions of end cap 30 is between 0.15 and 2 and more specifically between 0.25 and 1.7.

In particular embodiments, the ratio of the area of openings 40 and 42 to area of the solid portions of end cap 30 is between 0.15 and 0.45, specifically between 0.25 and 0.4, and more specifically between 0.3 and 0.35 of the total end cap area, and in one such specific embodiment, the diameter of end cap is between 2 and 3 inches and specifically is about 2.5 inches. In other particular embodiments, the ratio of the area of openings 40 and 42 to the area of the solid portions of end cap 30 is between 0.3 and 0.7, specifically between 0.4 and 0.6, and more specifically between 0.5 and 0.6 of the total end cap area, and in one such specific embodiment, the diameter of end cap 30 is between 3 and 5 inches and specifically is about 4 inches. In other particular embodiments, the ratio of the area of openings 40 and 42 to the area of the solid portions of end cap 30 is between 1 and 2, specifically between 1.4 and 1.8, and more specifically is between 1.55 and 1.75 of the total end cap area, and in one such specific embodiment, the diameter of end cap is between 5 and 7 inches and specifically is about 6 inches.

Still referring to FIG. 2, in various embodiments, openings 40 and 42 are substantially large compared to the coupling openings (e.g., openings 33 and 35) located within hub 32. In specific embodiments, the area of end cap 30 occupied by openings 40 and 42 is at least five times the area occupied by coupling openings 33 and 35, and more specifically the area of end cap 30 occupied by openings 40 and 42 is at least ten times the area occupied by coupling openings 33 and 35.

In various embodiments, openings 40 and 42 allow for end cap 30 to have a lower weight than that of a solid end cap or an end cap with smaller/fewer holes (at least for a given material type). In various embodiments, end cap 30 weighs between 0.1 lbs. and 1 lbs., and specifically between 0.2 lbs. and 0.8 lbs. In specific embodiments, the open end cap design discussed herein decreases the total end cap weight by between 40% to 80% as compared to a substantially closed, conventional end cap of the same diameter, and as noted above, such weight savings provide technical advantages including decreased power usage, improved battery life and decreased component/gear wear during usage and/or stopping.

In particular embodiments, as shown for example in FIG. 2, openings 40 and 42 are defined by interior surfaces of spokes 34 and 36 and of rim 38 such that the shapes of these surfaces define the shapes of openings 40 and 42. In various embodiments, it is believed that the number and shape of spokes 34 and 36 and the resulting shapes of openings 40 and 42 allow for spokes (particularly the radially outer surface of each spoke) to remain in compression (i.e., experiencing little or no tension) during clockwise rotation as experienced during cutting. It is believed that by maintaining these portions of spokes 34 and 36 in compression during cutting, end cap 30 is strengthened. It is believed that by limiting or eliminating the tensile forces that spokes 34 and 36 may experience, the strength of end cap 30 is increased, at least relative to spoke designs that experience tension.

In general, end cap 30 includes at least four spokes, shown as spokes 34 and 36. As shown in FIG. 2, spokes 34 and 36 are generally curved in the clockwise direction. Similar to the shape of openings 40 and 42 discussed above, each spoke 34 is a mirror image of the opposing spoke 34, and each spoke 36 is a mirror image of the opposing spoke 36.

In other embodiments, end cap 30 includes other numbers of spokes. In specific embodiments, end cap 30 includes two spokes.

As shown in FIG. 2, each spoke 34 includes clockwise-facing surface 44 and counterclockwise-facing surface 46. In this arrangement, clockwise-facing surface 44 is a concave surface, and counterclockwise-facing surface 46 is a convex surface. Further, the length of counterclockwise-facing surface 46 is greater than the length of clockwise-facing surface 44. In various embodiments, the length of counterclockwise-facing surface 46 is at least 10%, and specifically 25%, greater than the length of clockwise-facing surface 44. In specific embodiments, such as shown in FIG. 2, the length of counterclockwise-facing surface 46 is at least 60% greater, and specifically at least 180% greater than the length of clockwise-facing surface 44. In some embodiments, the lengths in the radial direction of at least one counterclockwise-facing surface 46 and clockwise-facing surface 44 is relatively large compared to the radius of end cap 30. In specific embodiments, the lengths in the radial direction of at least one counterclockwise-facing surface 46 and clockwise-facing surface 44 is at least 50% of the radius of end cap 30.

Similar to the shape of spokes 34, each spoke 36 includes clockwise-facing surface 48 and counterclockwise-facing surface 50. In this arrangement, clockwise-facing surface 48 is a concave surface, and counterclockwise-facing surface 50 is a convex surface. Further, the length of counterclockwise-facing surface 50 is greater than the length of clockwise-facing surface 48. In various embodiments, the length of counterclockwise-facing surface 50 is at least 10%, and specifically 25%, greater than the length of clockwise-facing surface 48. In specific embodiments, such as shown in FIG. 2, the length of counterclockwise-facing surface 50 is at least 30%, and specifically 65%, greater than the length of clockwise-facing surface 48.

In addition to the shapes discussed above, in the embodiment of FIG. 2, the portions of each spoke 34 and 36 adjacent to hub 32 is wider than the portions of spokes 34 and 36 adjacent rim 38. For example, in this arrangement, the center of mass of each spoke 34 and 36 is closer to the center point of end cap 30 than to the outer perimeter of rim 38.

Further, openings 40 and 42 each have a non-symmetrical shape. In the embodiment shown in FIG. 2, each opening 40 has a width, W1, and each opening 42 has a width, W2. As shown in FIG. 2, both W1 and W2 decrease in the circumferential clockwise direction. This relationship gives openings 40 and 42 the somewhat pointed appearance shown in FIG. 2. In addition, each spoke 34 and 36 has a maximum dimension in the circumferential direction that is less than the maximum dimension in the circumferential direction of either opening 40 or opening 42.

As shown in FIG. 2, the radially outermost edge of opening 40 is defined by a radially inward facing edge 52 of rim 38, and the radially outermost edge of opening 42 is defined by a radially inward facing edge 54 of rim 38. Edges 52 and 54 are aligned curved surfaces such that edges 52 and 54 have the same radius of curvature and same center point as each other and therefore lie in the same circular path as each other.

Inner edges 52 and 54 are defined by radius, R1. The outer edge of rim 38 and the outer radius of end cap 30 is defined by the radius, R2. In various embodiments, the difference between R1 and R2 (which also corresponds to rim 38 thickness at the position of openings 40 and 42) is relatively low which relates to the increased size of openings 40 and 42. In various embodiments, R1 is between 50% and 99% of R2, specifically between 65% and 99% of R2 and more specifically between 70% and 95% of R2. In a specific embodiment, R1 is between 90% and 99% of R2 and specifically is between 93% and 95% of R2, and in such embodiments, R2 is about 3 inches (e.g., 3 inches plus or minus 0.05 inches). In a specific embodiment, R1 is between 80% and 90% of R2 and specifically is between 83% and 85% of R2, and in such embodiments, R2 is about 2 inches (e.g., 2 inches plus or minus 0.05 inches). In a specific embodiment, R1 is between 70% and 80% of R2 and specifically is between 73% and 75% of R2, and in such embodiments, R2 is about 1.25 inches (e.g., 1.25 inches plus or minus 0.05 inches).

It should be noted that openings 40 and 42 are distinct from the mounting and pin-receiving openings located within hub 32. In the embodiment shown, centroids of openings 40 and 42 (one centroid 56 of opening 42 is labeled in FIG. 2 as an example) are located such that the distance from the center point of end cap 30 to the centroids of openings 40 and 42 is greater than greatest distance from the center point of end cap 30 to the center of the outermost one of the mounting holes. In particular embodiments, the centroids of openings 40 and 42 are outwardly positioned such that the radial distance from the center point of end cap 30 to each of the centroids of openings 40 and 42, shown for example as R3, is at least 35% of the outer radius R1. In other embodiments, the centroids of openings 40 and 42 are outwardly positioned such that the R3 is between 40% and 90% of the outer radius R1.

In various embodiments, spokes 34 and 36 are formed from a single, solid, continuous and contiguous piece of material, such as a metal material. In such embodiments, upper and lower surfaces of spokes 34 and 36 define the upper and lower most surfaces of the end cap at the location of the spokes, such that openings 40 and 42 define openings to access the central cavity 22 of hole saw 10, as discussed above. In specific embodiments, hub 32, spokes 34 and 36 and rim 38 are formed from a single, solid, continuous and contiguous piece of rigid material, such as a metal material. In various embodiments, end cap 30 may be made from any suitable rigid material, including metals such as steel, stainless steel, plastics, ceramics, etc.

Figure 3:
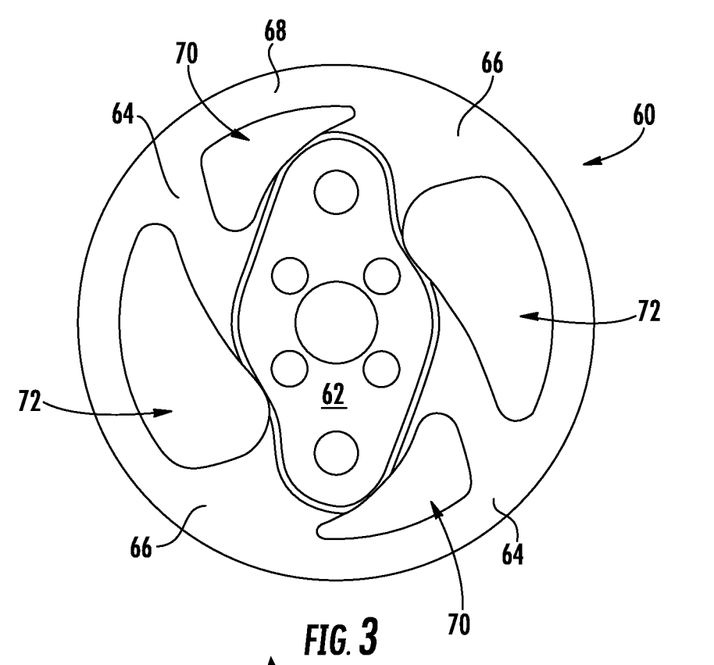
FIG. 3 is a top plan view of an end cap of a hole saw, according to another exemplary embodiment.

Referring to FIG. 3, another embodiment of a hole saw end cap, such as end cap 60, is shown. End cap 60 is substantially the same as end cap 30 except as discussed herein. End cap 60 includes spokes 64 and 66 extending from a hub 62 to rim 68. In general, spokes 64 and 66 are thicker in the circumferential direction than the spokes of end cap 30, and rim 68 is thicker in the radial direction than the rim of end cap 30. However, in another embodiment, the circumferential thicknesses of spokes 64 and 66 is constant along the radial length of the spoke.

In the embodiment shown in FIG. 3, openings 70 are substantially smaller in area than openings 72 which is the result, at least in part, of the increased circumferential thickness of spokes 66. In various embodiments, the area of openings 70 are less than 80% of the area of openings 72, and more specifically between 20% and 60% of the area of openings 72. In a specific embodiment, the area of openings 70 is less than 40% of the area of openings 72. In a specific embodiment, end cap 60 has a diameter of 4 inches and is shaped to include one or more of the various relative opening and metal measurements, discussed above.

Figure 4:
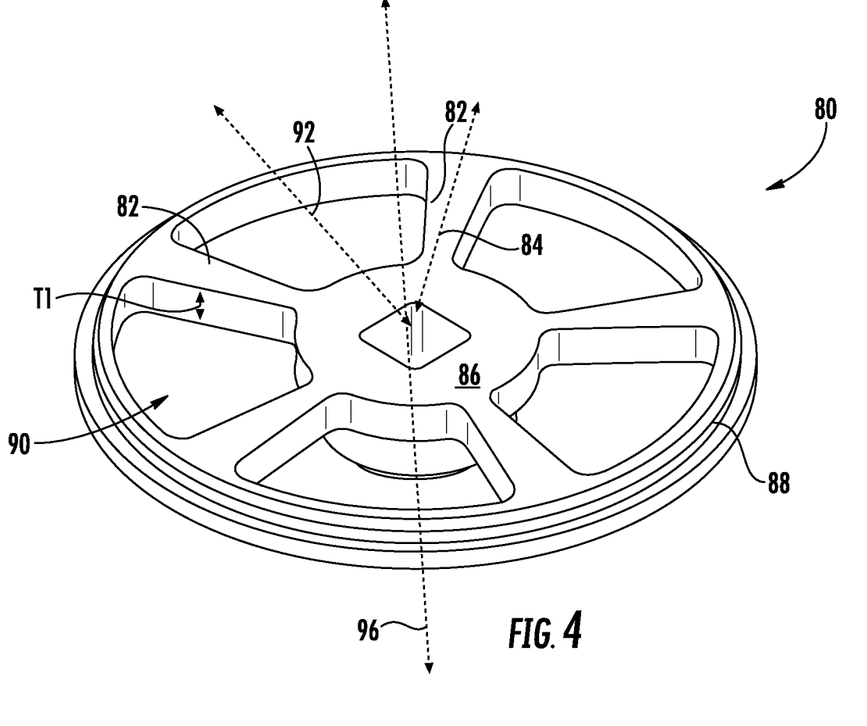
FIG. 4 is a perspective view of an end cap of a hole saw, according to another exemplary embodiment.

Referring to FIG. 4, another embodiment of a hole saw end cap, such as end cap 80, is shown. End cap 80 is substantially the same as end cap 30 except as discussed herein. In general (and in contrast to end caps 30 and 60), end cap 80 includes 4 or more radially extending spokes 82 that are substantially symmetrical about a radial axis 84 that bisects each spoke 82. In the specific embodiment shown, end cap 80 includes five radially extending spokes 82 that are evenly spaced around hub 86.

The clockwise and counterclockwise facing surfaces of spokes 82 along with radial outward facing surfaces of hub 86 and radially inward facing surface of hub 86 define a plurality of openings 90. The symmetry and even spacing of spokes 82 form openings 90 that all have the same shape as each other. Further, each opening 90 is symmetrical about a radial axis 92 bisecting each opening 90. Further, spokes 82 have a tapered shape such that the circumferential thickness of each spoke increases as the distance toward rim 88 increases. In another embodiment, the circumferential thicknesses of spokes 82 are constant along the radial length of the spoke. In another embodiment, spokes 82 are tapered such that the circumferential thicknesses of spokes 82 decreases along the spoke as the distance toward rim 88 increases.

In various embodiments, the thickness, T1, of spokes 82 in the axial direction (e.g., z-axis), shown by axis 96, may vary along the radial or circumferential length of spoke 82. For example, in various embodiments, T1 may increase along the spoke as the distance toward rim 88 increases, and in some such embodiments, T1 may reach a maximum adjacent rim 88. As another example, in various embodiments, T1 may increase in the circumferential decrease as the distance towards radial axis 84 increases, and in some such embodiments, T1 may reach a maximum in the circumferential direction at the center of spoke 82 along axis 84. In various embodiments, the variation of T1 in the radial or circumferential direction may allow for an even lower weight end cap 80. In various embodiments, end cap 80 includes any of the different opening size percentages, opening to material percentages, weights, etc. discussed herein.

Figure 5:
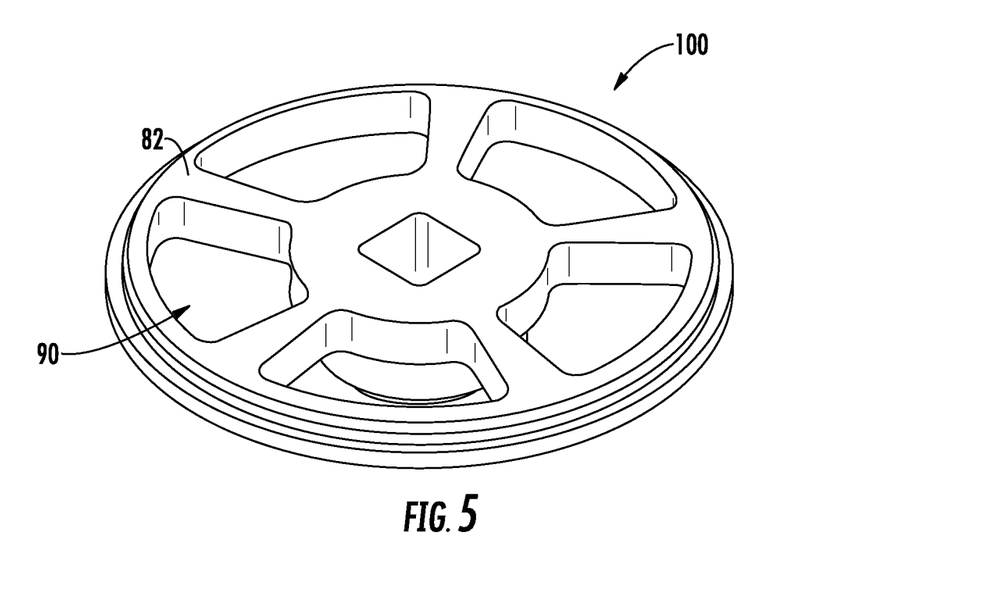
FIG. 5 is a perspective view of an end cap of a hole saw, according to another exemplary embodiment.
Figure 6:
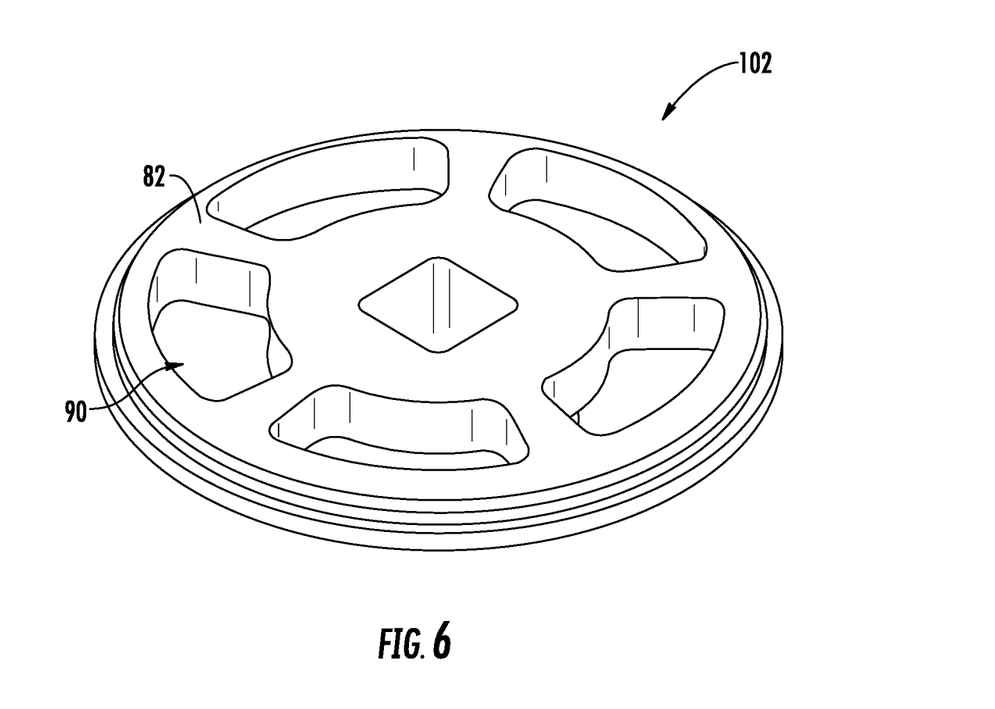
FIG. 6 is a perspective view of an end cap of a hole saw, according to another exemplary embodiment.
Figure 7:
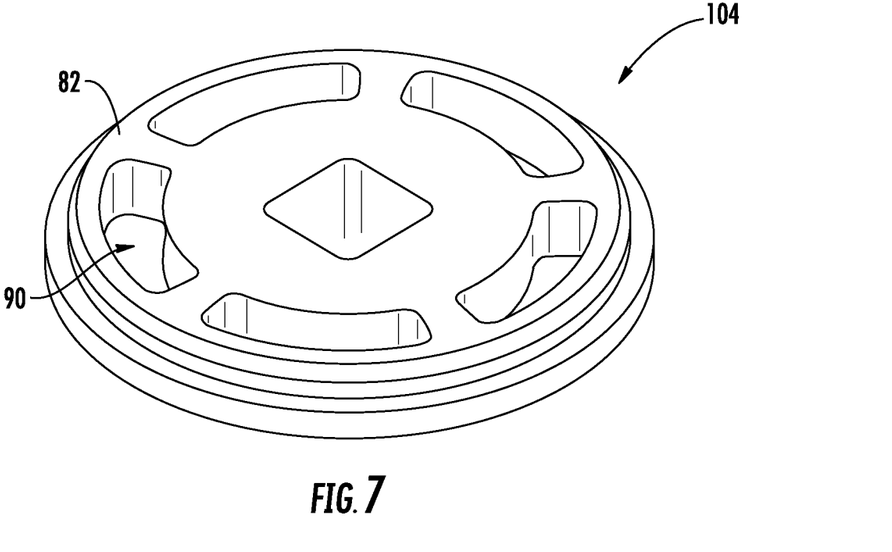
FIG. 7 is a perspective view of an end cap of a hole saw, according to another exemplary embodiment.

Referring to FIGS. 5-7, additional embodiments of a hole saw end cap, such as end caps 100, 102 and 104, are shown. End caps 100, 102 and 104 have the same five spoke design as end cap 80, but have differing and/or smaller outer diameters than that of end cap 80. In the design of each of end caps 100, 102 and 104, the length of spokes 82 and the size of openings 90 is decreased relative to the sizes of the same portions of end cap 80 to account for the lower diameter of the end caps. In various embodiments, any of the end cap designs, design features, dimensions, relative sizes, etc. of any of the embodiments discussed herein may be incorporated in to an end cap for a hole saw of any diameter. In various embodiments, the end cap designs discussed herein may be utilized for hole saws having diameters of 1 inch, 1½ inches, 1¾ inches, 2 inches, 2½ inches, 2 9/16 inches, 3 inches, 4 inches, 6 inches, etc.

Figure 8:
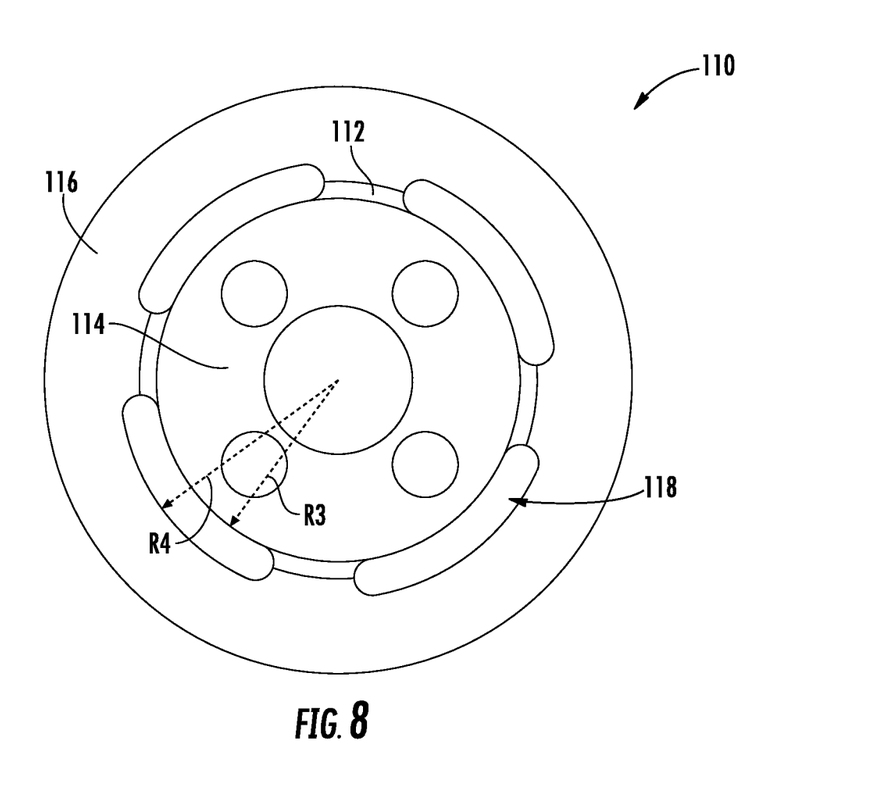
FIG. 8 is a top plan view of an end cap of a hole saw, according to another exemplary embodiment.

Referring to FIG. 8, another embodiment of a hole saw end cap, such as end cap 110, is shown. End cap 110 is substantially the same as end cap 80 except as discussed herein. End cap 110 includes four spokes 112. Similar to the spokes of end cap 80, spokes 112 are symmetrical about a bisecting radial axis of the spoke. Spokes 112, hub 114 and rim 116 define four openings 118. Further, the arrangement of spokes 112 and openings 118 define a pattern such that end cap 110 is radially symmetric.

As shown in FIG. 8, openings 118 are relatively large and sized such that end cap 110 has a relatively low weight and provides the various functions discussed above. In various embodiments, openings 118 have a large circumferential length. In various embodiments, openings 118 have an arc length of between 40 degrees and 80 degrees, specifically between 50 degrees and 60 degrees, and more specifically of about 55 degrees (e.g., 55 degrees plus or minus 1 degree). In the embodiment shown, the arc lengths of openings 118 are measured between ends of openings 118 prior to the beginning of the curved end surfaces. In various embodiments, openings 118 are defined by an inner radius, R3, and an outer radius, R4. In various embodiments, R4 is between 105% and 150% of R3, specifically between 110% and 130% of R3, and more specifically is between 115% and 125% of R3.

Figure 9:
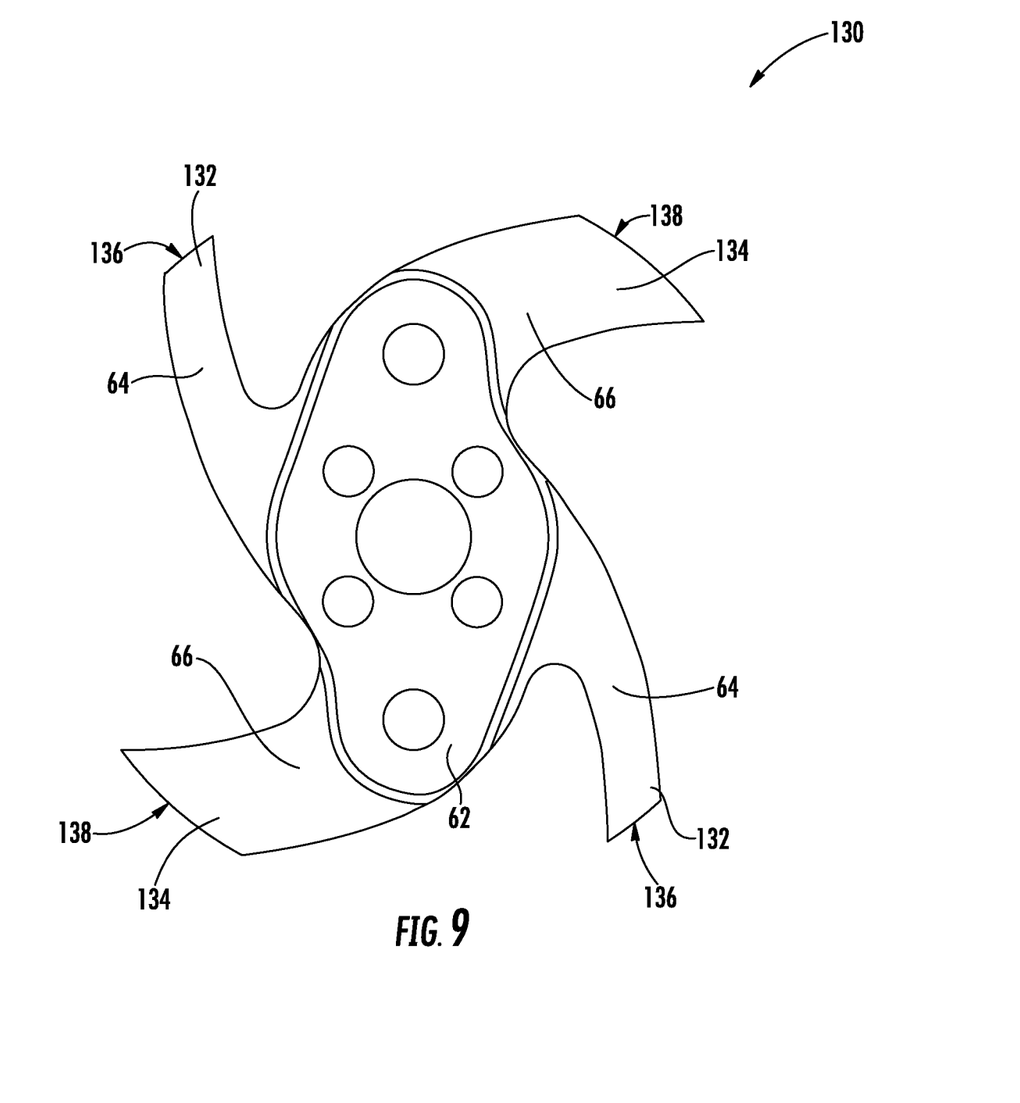
FIG. 9 is a top plan view of an end cap of a hole saw, according to another exemplary embodiment.

Referring to FIG. 9, another embodiment of a hole saw end cap, such as end cap 130, is shown. End cap 130 is substantially the same as end cap 60 except as discussed herein. End cap 130 includes spokes 64 and 66 extending outward from hub 62. In this embodiment, end cap 130 does not include an outer rim (such as rim 68 shown in FIG. 3). In this embodiment, spokes 64 each include an outer section 132, and spokes 66 each include an outer section 134. In effect outer sections 132 and 134 increase the length of spokes 64 and 66 respectively such that the total outer diameter of end cap 130 is substantially same as the outer diameter of similarly structured end cap having an outer rim. In the particular embodiment shown, outer sections 132 and 134 each have outer most edges 136 and 138, respectively, that each have the same radius of curvature as each other such that edges 136 and 138 lie on the same circular path as each other. As will be understood in this embodiment, the cylindrical sidewall of the hole saw is coupled to outer sections 132 and 134 at edges 136 and 138.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another, or with the two members and any additional member being attached to one another. Such joining may be permanent in nature or alternatively may be removable or releasable in nature. Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A hole saw end cap, comprising:
   a hub;
   a central hole located in a center of the hub and extending through the hub, wherein the central hole is configured to couple the hub to an arbor of a driving device; and
   spokes extending radially outward from the hub, wherein openings are formed between the spokes and each of the spokes end at an outer radial edge section;
   wherein a first spoke is thicker in an axial direction through the end cap than a second spoke and an opening is formed between the first spoke and the second spoke;
   wherein the hub includes an upper and lower surface;
   wherein the spokes include an upper and lower surface;
   wherein the upper surfaces of the hub and spokes together define the uppermost surface of the end cap and the lower surfaces of the hub and spokes together define the lowermost surface of the end cap;
   wherein no circumferential outer rim is coupled to the outer radial edge sections of the spokes such that the outer radial edge sections of the spokes define the radially outermost surface of the hole saw end cap.

2. The hole saw end cap of claim 1, wherein the outer radial edge sections of the spokes are aligned curved surfaces and each have the same radius of curvature and same center point as each other.

3. The hole saw end cap of claim 1, further comprising drive pin holes that receive drive pins of the arbor.

4. The hole saw end cap of claim 1, further comprising four spokes that are curved in a clockwise direction.

5. The hole saw end cap of claim 4, wherein the spokes of the end cap comprise a first pair of spokes and a second pair of spokes, wherein each spoke in the first pair of spokes is a mirror image of an opposing spoke, and wherein each spoke in the second pair of spokes is a mirror image of an opposing spoke.

6. The hole saw end cap of claim 1, wherein each spoke comprises a clockwise-facing surface and a counterclockwise-facing surface, both extending radially from the hub to the outer radial edge section of each spoke, wherein the clockwise-facing surface of each spoke is a concave surface, and the counterclockwise-facing surface of each spoke is a convex surface.

7. The hole saw end cap of claim 6 wherein a length of the counterclockwise-facing surface is greater than a length of the clockwise-facing surface.

8. The hole saw end cap of claim 7, wherein the length of the counterclockwise-facing surface is at least 10% greater than the length of the clockwise-facing surface.

9. A hole saw, comprising:
   an end cap, comprising:
      a central hub;
      a central hole located in a center of the central hub and extending through the central hub, wherein the central hole is configured to couple the central hub to an arbor of a driving device; and
      a first pair of spokes comprising a first spoke and a second spoke each spoke extending radially outward from the central hub, wherein openings are formed between the first spoke and the second spoke and wherein the first spoke and the second spoke each end at an outer radial edge section having a curved surface, wherein the curved surface of the first spoke has the same radius of curvature and the same center point as the curved surface of the second spoke;
   wherein no circumferential outer rim is coupled to the outer radial edge section of the spokes such that the outer radial edge sections of the spokes define the radially outer surface of the hole saw end cap; and
   a sidewall comprising a body with cutting teeth on a first end of the sidewall body and a second end coupled to the outer edge sections of the spokes of the end cap, wherein a lower surface of the first pair of spokes and a lower surface of the central hub together define a lowermost outward facing surface of the end cap, such that the lowermost surface directly faces the cutting teeth on the first end of the sidewall body;
   through-bore openings between upper and lower surfaces of the end cap that extend between the spokes and the sidewall, wherein the openings are not radially symmetric.

10. The hole saw of claim 9, wherein a radially outer surface of each spoke is in compression during clockwise rotation as experienced during cutting.

11. The hole saw of claim 9, wherein the spokes have a tapered shape such that a circumferential thickness of each spoke increases as a distance from the outer edge section increases.

12. The hole saw of claim 9, further comprising drive pin holes extending through the central hub of the end cap, the drive pin holes being configured to receive drive pins on the arbor of the driving device.

13. The hole saw of claim 9, further comprising a second pair of spokes on the end cap, the second pair of spokes comprising a third spoke and a fourth spoke opposite the third spoke, the third spoke and the fourth spoke each extending radially outward from the central hub, wherein the first spoke is opposite and a mirror image of the second spoke in the first pair of spokes, and the third spoke is a mirror image of the fourth spoke in the second pair of spokes.

14. The hole saw of claim 13, wherein each of the first and the second spokes in the first pair of spokes has a different shape than each of the third and the fourth spokes in the second pair of spokes.

15. The hole saw of claim 13, wherein the first pair of spokes has a different size than the second pair of spokes.

16. The hole saw of claim 13, wherein the first pair of spokes is thicker than the second pair of spokes.

17. A hole saw, comprising:
a sidewall comprising cutting teeth on a first end of the sidewall and a second end opposite the first end;
an end cap, comprising:
a central hub;
a central hole located in a center of the central hub and extending through the central hub, wherein the central hole is configured to couple the central hub to an arbor of a driving device; and
a first pair of spokes comprising a first spoke and a second spoke each extending radially outward from the central hub, wherein a radial end of the spokes has no outer rim and ends at an outer edge section, wherein openings are formed between the first spoke and the second spoke and wherein the first spoke and the second spoke each end at an outer radial edge section having a curved surface, wherein the curved surface of the first spoke has the same radius of curvature and the same center point as the curved surface of the second spoke;
a second pair of spokes, wherein each spoke in the first pair of spokes is a mirror image of an opposite spoke, and each spoke in the second pair of spokes is a mirror image of an opposite spoke, and wherein each spoke in the first pair of spokes has a different shape and a different size than each spoke in the second pair of spokes;
wherein no circumferential outer rim is coupled to the outer radial edge section of the spokes such that the outer radial edge section of the spokes define the radially outer surface of the hole saw end cap; and
an arbor coupled to the end cap and extending directly outward from an outermost surface of the end cap defined by an upper surface of the central hub and an upper surface of the first pair of spokes, wherein when the arbor is rotated by a driving device, the arbor rotates the sidewall through the spokes to rotate the cutting teeth on the sidewall.

18. A hole saw end cap, comprising:
a hub;
a central hole located in a center of the hub and extending through the hub, wherein the central hole is configured to couple the hub to an arbor of a driving device; and
spokes extending radially outward from the hub, wherein openings are formed between the spokes and each of the spokes end at an outer radial edge section;
wherein the hub includes an upper and lower surface;
wherein the spokes include four spokes that are curved in a clockwise direction and an upper and lower surface;
wherein the upper surfaces of the hub and spokes together define the uppermost surface of the end cap and the lower surfaces of the hub and spokes together define the lowermost surface of the end cap;
wherein no circumferential outer rim is coupled to the outer radial edge sections of the spokes such that the outer radial edge sections of the spokes define the radially outermost surface of the hole saw end cap.

19. A hole saw end cap, comprising:
a hub;
a central hole located in a center of the hub and extending through the hub, wherein the central hole is configured to couple the hub to an arbor of a driving device; and
spokes extending radially outward from the hub, wherein openings are formed between the spokes and each of the spokes end at an outer radial edge section;
wherein the hub includes an upper and lower surface;
wherein the spokes include an upper and lower surface;
wherein the upper surfaces of the hub and spokes together define the uppermost surface of the end cap and the lower surfaces of the hub and spokes together define the lowermost surface of the end cap;
wherein no circumferential outer rim is coupled to the outer radial edge sections of the spokes such that the outer radial edge sections of the spokes define the radially outermost surface of the hole saw end cap;
wherein each spoke comprises a clockwise-facing surface and a counterclockwise-facing surface, both extending radially from the hub to the outer radial edge section of each spoke, wherein the clockwise-facing surface of each spoke is a concave surface, and the counterclockwise-facing surface of each spoke is a convex surface.

20. A hole saw, comprising:
an end cap, comprising:
a central hub;
a central hole located in a center of the central hub and extending through the central hub, wherein the central hole is configured to couple the central hub to an arbor of a driving device; and
a first pair of spokes comprising a first spoke and a second spoke each spoke extending radially outward from the central hub, wherein openings are formed between the first spoke and the second spoke and wherein the first spoke and the second spoke each end at an outer radial edge section having a curved surface, wherein the curved surface of the first spoke has the same radius of curvature and the same center point as the curved surface of the second spoke;
wherein the spokes have a tapered shape such that a circumferential thickness of each spoke increases as a distance from the outer edge section increases
wherein no circumferential outer rim is coupled to the outer radial edge section of the spokes such that the outer radial edge sections of the spokes define the radially outer surface of the hole saw end cap; and
a sidewall comprising a body with cutting teeth on a first end of the sidewall body and a second end coupled to the outer edge sections of the spokes of the end cap, wherein a lower surface of the first pair of spokes and a lower surface of the central hub together define a lowermost outward facing surface of the end cap, such that the lowermost surface directly faces the cutting teeth on the first end of the sidewall body.

* * * * *